United States Patent
Odinak (10) Patent No.: US 8,521,528 B2
(45) Date of Patent: *Aug. 27, 2013

(54) SYSTEM AND METHOD FOR DISTRIBUTED SPEECH RECOGNITION

(75) Inventor: Gilad Odinak, Bellevue, WA (US)

(73) Assignee: Intellisist, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,451

(22) Filed: Jun. 18, 2012

(65) Prior Publication Data

US 2012/0253806 A1 Oct. 4, 2012

Related U.S. Application Data (63) Continuation of application No. 12/058,501, filed on Mar. 28, 2008, now Pat. No. 8,204,746.

(60) Provisional application No. 60/920,849, filed on Mar. 29, 2007.

(51) Int. Cl.
*G10L 15/04* (2013.01)

(52) U.S. Cl.
USPC .......................... 704/244; 704/235; 704/251

(58) Field of Classification Search
USPC ................................................ 704/231–257
See application file for complete search history.

(56) References Cited

U.S. PATENT DOCUMENTS

| | | | |
|---|---|---|---|
| 5,956,683 A | 9/1999 | Jacobs et al. | |
| 5,960,399 A | 9/1999 | Barclay et al. | |
| 6,633,846 B1 | 10/2003 | Bennett et al. | |
| 6,704,707 B2 * | 3/2004 | Anderson et al. | 704/231 |
| 7,092,888 B1 | 8/2006 | McCarthy et al. | |
| 2003/0125948 A1 | 7/2003 | Lyudovyk | |
| 2005/0002502 A1 | 1/2005 | Cloran | |
| 2006/0009980 A1 | 1/2006 | Burke et al. | |

OTHER PUBLICATIONS

Zhang et al., "The Study on Distributed Speech Recognition System," Acoustics, Speech, and Signal Processing, 2000. ICASSP '00. Proceedings. 2000 IEEE International Conference on Jun. 5-9, 2000, Piscataway, NJ, USA, IEEE, vol. 3, pp. 1431-1434 (Jun. 5, 2000).

Zhou et al., "Lucent Automatic Speech Recognition: A Speech Recognition Engine for Internet and Telephony Service Applications," ICSLP 2000, pp. 1-4 (Oct. 16, 2000).

* cited by examiner

*Primary Examiner* — Samuel G Neway
(74) *Attorney, Agent, or Firm* — Patrick J. S. Inouye; Krista A. Wittman

(57) ABSTRACT

A system and method for distributed speech recognition is provided. Audio data is obtained from a caller participating in a call with an agent. A main recognizer receives a main grammar template and the audio data. A plurality of secondary recognizers each receive the audio data and a reference that identifies a secondary grammar, which is a non-overlapping section of the main grammar template. Speech recognition is performed on each of the secondary recognizers and speech recognition results are identified by applying the secondary grammar to the audio data. An n number of most likely speech recognition results are selected. The main recognizer constructs a new grammar based on the main grammar template using the speech recognition results from each of the secondary recognizers as a new vocabulary. Further speech recognition results are identified by applying the new grammar to the audio data.

20 Claims, 9 Drawing Sheets

SYSTEM AND METHOD FOR DISTRIBUTED SPEECH RECOGNITION

CROSS-REFERENCE TO RELATED APPLICATION

This non-provisional patent application is a continuation of U.S. Pat. No. 8,204,746, issued Jun. 19, 2012; which claims priority to U.S. Provisional Patent Application, Ser. No. 60/920,849, filed Mar. 29, 2007, the disclosure of which is incorporated by reference.

FIELD

The invention relates in general to speech recognition and, specifically, to a system and method for distributed speech recognition.

BACKGROUND

Customer call centers, or simply, "call centers," are often the first point of contact for customers seeking direct assistance from manufacturers and service vendors. Call centers are reachable by telephone, including data network-based telephone services, such as Voice-Over-Internet (VoIP), and provide customer support and problem resolution. Although World Wide Web- and email-based customer support are becoming increasingly available, call centers still offer a convenient and universally-accessible forum for remote customer assistance.

The timeliness and quality of service provided by call centers is critical to ensuring customer satisfaction, particularly where caller responses are generated through automation. Generally, the expectation level of callers is lower when they are aware that an automated system, rather than a live human agent, is providing assistance. However, customers become less tolerant of delays, particularly when the delays occur before every automated system-generated response. Minimizing delays is crucial, even when caller volume is high.

Automated call processing requires on-the-fly speech recognition. Parts of speech are matched against a stored grammar that represents the automated system's "vocabulary." Spoken words and phrases are identified from which the caller's needs are determined, which can require obtaining further information from the caller, routing the call, or playing information to the caller in audio form.

Accurate speech recognition hinges on a rich grammar embodying a large vocabulary. However, a rich grammar, particularly when provided in multiple languages, creates a large search space and machine latency can increase exponentially as the size of a grammar grows. Consequently, the time required to generate an automated response will also increase. Conventional approaches to minimizing automated system response delays compromise quality over speed.

U.S. Pat. No. 7,606,718, issued Oct. 20, 2009, to Cloren, discloses an apparatus and method for processing service interactions. An interactive voice and data response system uses a combination of human agents, advanced speech recognition, and expert systems to intelligently respond to customer inputs. Customer utterances or text are interpreted through speech recognition and human intelligence. Human agents are involved only intermittently during the course of a customer call to free individual agents from being tied up for the entire call duration. Multiple agents could be used in tandem to check customer intent and input data and the number of agents assigned to each component of customer interaction can be dynamically adjusted to balance workload. However, to accommodate significant end-user traffic, the Cloren system trades off speech recognition accuracy against agent availability and system performance progressively decays under increased caller volume.

Therefore, there is a need for providing speech recognition for an automated call center that minimizes caller response delays and ensures consistent quality and accuracy independent of caller volume. Preferably, such an approach would use tiered control structures to provide distributed voice recognition and decreased latency times while minimizing the roles of interactive human agents.

SUMMARY

A system and method includes a centralized message server, a main speech recognizer, and one or more secondary speech recognizers. Additional levels of speech recognition servers are possible. The message server initiates a session with the main speech recognizer, which initiates a session with each of the secondary speech recognizers for each call received through a telephony interface. The main speech recognizer stores and forwards streamed audio data to each of the secondary speech recognizers and a secondary grammar reference that identifies a non-overlapping grammar section that is assigned to each respective secondary speech recognizer by the message server. Each secondary speech recognizer performs speech recognition on the streamed audio data against the assigned secondary grammar to generate secondary search results, which are sent to the main speech recognizer for incorporation into a new grammar that is generated using a main grammar template provided by the message server. The main speech recognizer performs speech recognition on the stored streamed audio data to generate a set of search results, which are sent to the message server. The main speech recognizer employs a form of an n-best algorithm, which chooses the n most-likely search results from each of the secondary search results to build the new grammar.

One embodiment provides a system and method for distributed speech recognition. Audio data is obtained from a caller participating in a call with an agent. A main recognizer receives a main grammar template and the audio data. A plurality of secondary recognizers each receive the audio data and a reference that identifies a secondary grammar, which is a non-overlapping section of the main grammar template. Speech recognition is performed on each of the secondary recognizers and speech recognition results are identified by applying the secondary grammar to the audio data. An n number of most likely speech recognition results are selected. The main recognizer constructs a new grammar based on the main grammar template using the speech recognition results from each of the secondary recognizers as a new vocabulary. Further speech recognition results are identified by applying the new grammar to the audio data. Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Prior Art Call Processing System

Figure 1:
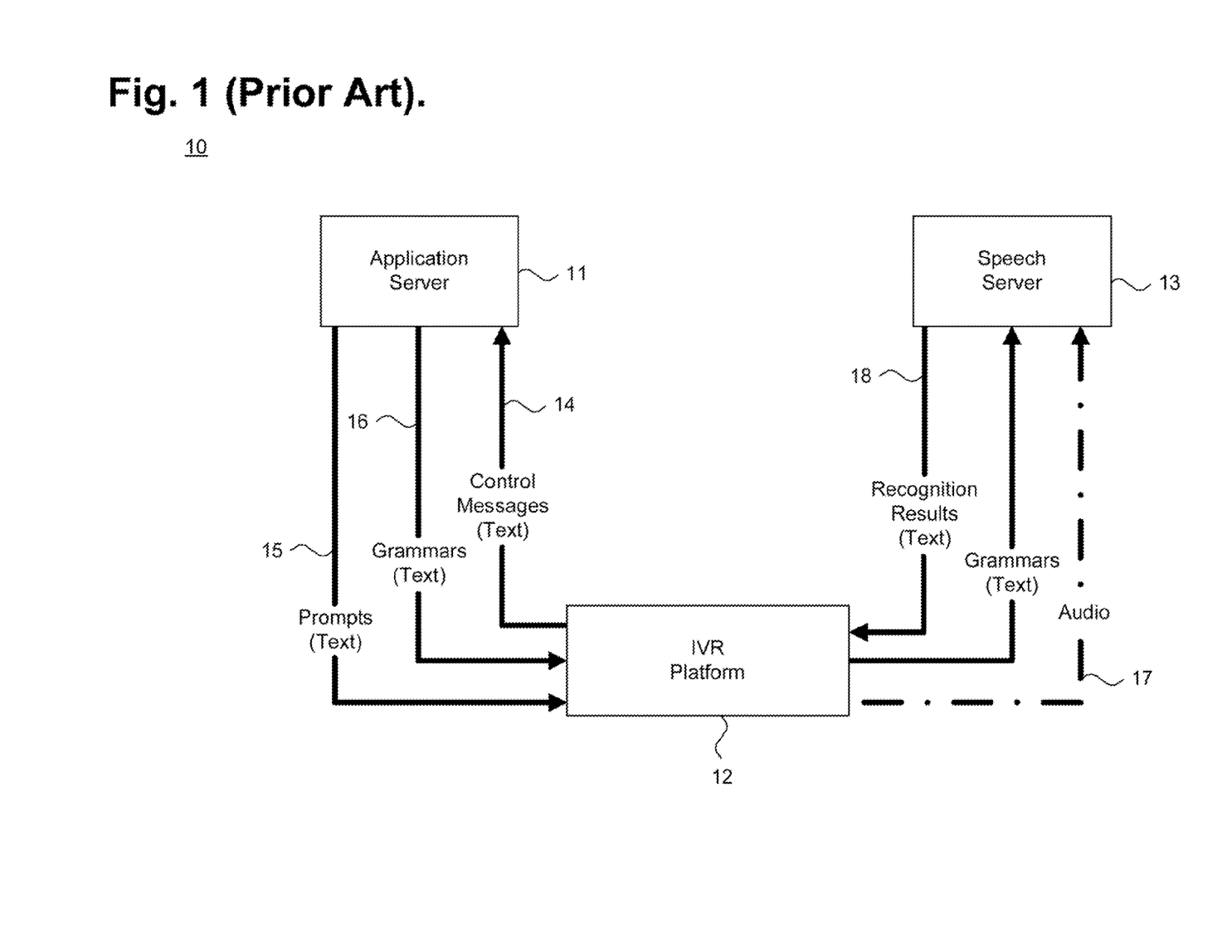
FIG. 1 is a block diagram showing a prior art call system for processing incoming calls.

Due to the inflexibility of conventional call systems, callers often experience long hold times, which can lead to frustration and possible loss of revenue. FIG. 1 is a block diagram showing a prior art call system 10 for processing incoming calls. A call is received from a caller through an interactive voice response ("IVR") platform 12. Upon receipt of the call, the IVR platform 12 sends a control message 14 to notify an application server 11 that a call has been received. The application server 11 is responsible for maintaining call flow and providing instructions to the IVR platform 12 for responding to the caller's needs. The application server 11 sends a grammar reference 16 and prompts 15 to the IVR platform 12. The prompts 15 can include call information in the form of a file or script, as well as other forms of data. If the prompts 15 include audio stored in the file or script, the prompt can be automatically played to the caller. Otherwise, if the prompts 15 include text, the text is sent to a text-to-speech engine (not shown) for conversion to audio, which is then sent to the IVR platform 12 for playback to the caller. The call information included in the prompts 15 can include questions, caller data, or product information, as well as other types of call information. Once played, the caller provides audio responses 17, including speech utterances, in response to the prompts 15, which are collected by the IVR platform 12 and transmitted to the speech server 13.

The speech server 13 performs speech recognition by analyzing the speech utterances 17 using the grammar reference 16. The grammar reference 16 is applied to the speech utterances 17 to identify parts of speech that match the grammar, which can be recorded as speech recognition results 18 for use in determining the caller's needs. The speech recognition results 18 are transmitted to the application server 11 via the IVR platform 12. The application server 11 determines whether additional information is needed from the caller. If required, a further prompt 15 can be selected and sent to the IVR platform 12 for collecting additional audio responses 17 from the caller. A confidence level can be assigned to the speech recognition results, which provides a score indicating the accuracy of the results.

Figure 2:
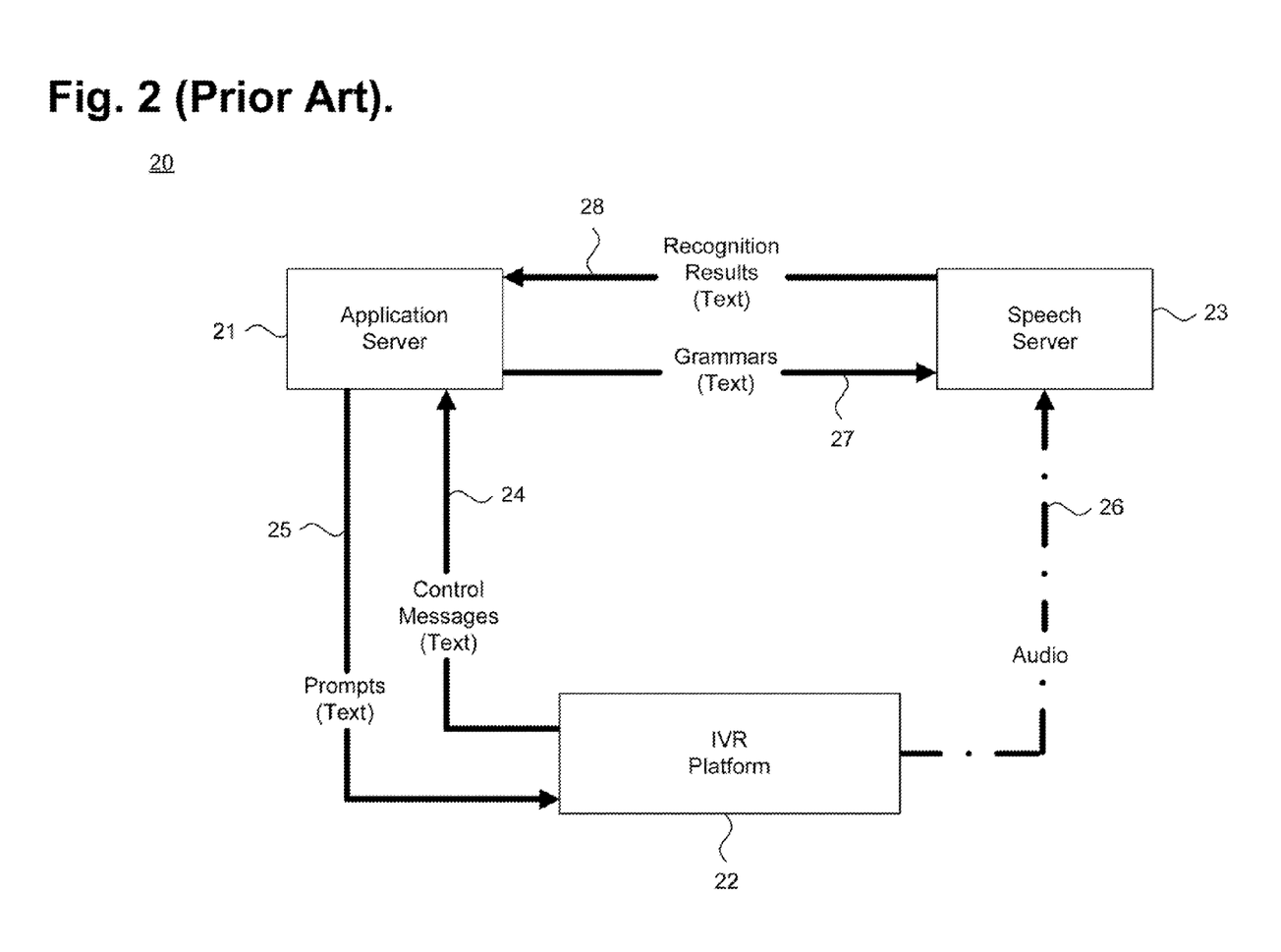
FIG. 2 is a block diagram showing another prior art call system for processing incoming calls.

The application server and the speech server can also communicate directly, rather than through the IVR platform. FIG. 2 is a block diagram showing another prior art call system 20 for processing incoming calls. A call is received through an IVR platform 22, which provides access to a voice and data network. The IVR platform 22 sends a control message 24 to an application server 21 to report the received call. The application server 21 transmits a grammar reference 27 to a speech server 23 and a prompt 25 to the IVR platform 22. The prompt can include call information in the form of a file or script. The call information can include questions, caller data, or product information. Other types of prompts and call information are possible.

If the prompt 25 includes audio, the prompt is automatically played to the caller through the IVR platform 22. When the prompt 25 includes text, the text is first converted using a text-to-speech engine (not shown) for playback to the caller. The caller can provide audio responses 26, which include speech utterances, in response to the prompts 25. The speech utterances 26 are collected from the caller and transmitted to a speech server 23, which coordinates the grammar reference 27 and the speech utterances 26. The speech server 23 performs speech recognition by applying the grammar reference 27 to the speech utterances 26 to identify parts of speech that can be recorded as speech recognition results 28. The speech recognition results 28 are directly sent to the application server 21 for further processing. If additional information is needed from the caller, the process of obtaining and processing the audio responses is repeated.

System for Performing Distributed Speech Recognition

Prior art call systems, such as described above with reference to FIGS. 1 and 2, perform speech recognition using a single call grammar, which contains the entire "vocabulary" for the conventional call system. Increasing the size or "richness" of the grammar can increase the accuracy of the speech recognition. However, a rich grammar can also create a larger search space. Consequently, the processing time for speech recognition grows proportionately as the size of the grammar grows.

Figure 3:
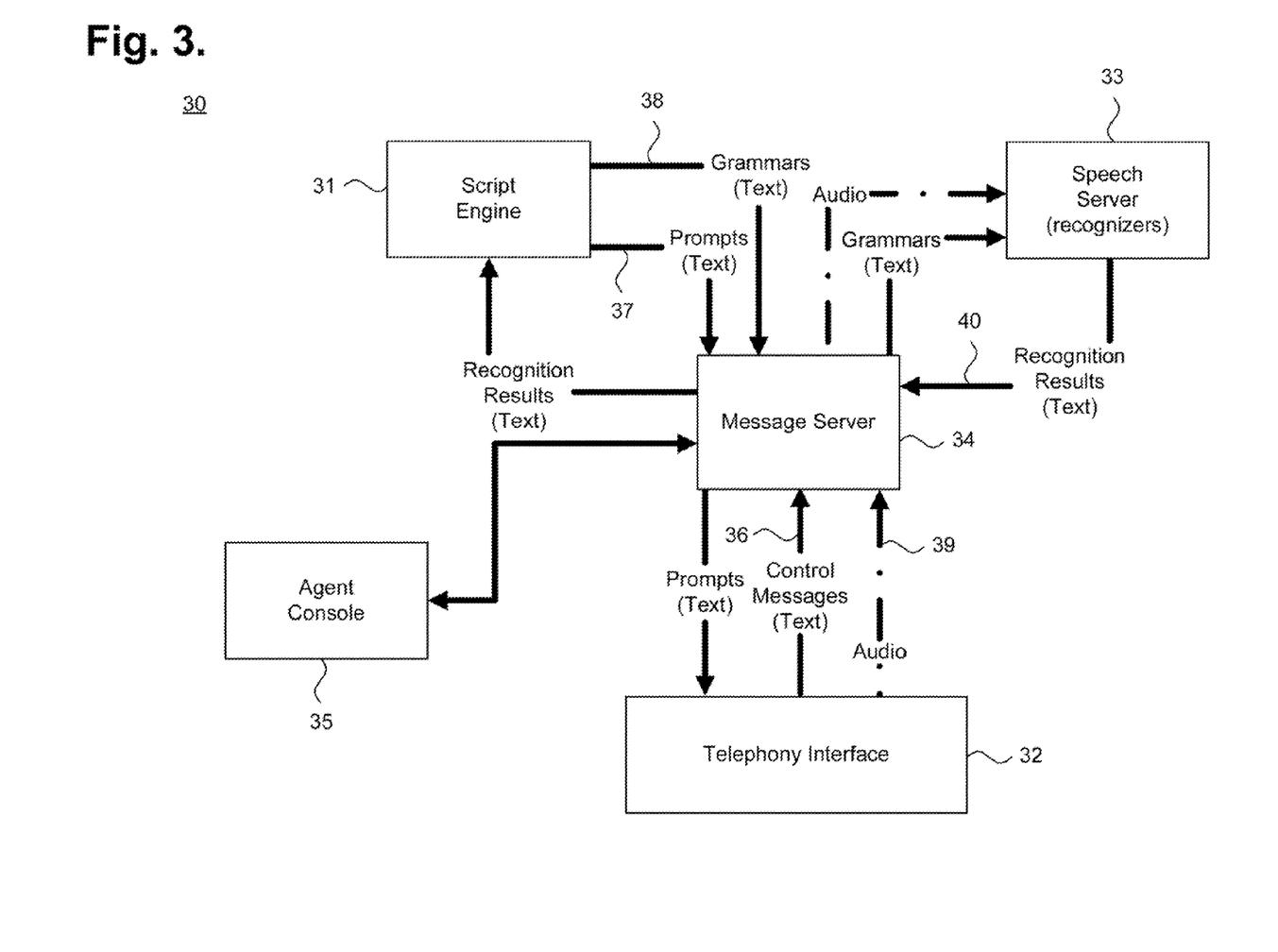
FIG. 3 is a block diagram showing a system for performing distributed speech recognition as a form of automated call center inline architecture, in accordance with one embodiment.

To decrease the delays created by the use of a rich grammar while still maintaining accurate results, distributed call center processing can be performed by delegating individualized speech recognition tasks over a plurality of hierarchically-structured speech recognizers. FIG. 3 is a block diagram showing a system for performing distributed speech recognition 30 as a form of automated call center inline architecture, in accordance with one embodiment. A message server 34 provides a message-based communications infrastructure for automated call center operation, such as described in commonly-assigned U.S. Pat. No. 7,292,689, issued Nov. 6, 2007, to Odinak et al., and in commonly-assigned U.S. Patent Application Publication No. 2007/0162282, published Jul. 12, 2007, to Odinak, abandoned, the disclosures of which are incorporated by reference. During regular operation, the message server 11 executes multiple threads to process multiple calls simultaneously, which are handled by agents executing agent applications on agent consoles 35. In addition, the message server 11 acts as a go-between to allow communication between the modules of the system, which include a telephony interface 32, a script engine 31, a speech server 33, and an agent console 34.

The calls are received through the telephony interface 32, which sends control messages 36 to the script engine 31 via the message server 34 to inform the script engine 31 of the received call. In return, the script engine 31 sends prompts 37 and a plurality of grammar references 38 to the message server 34. The message server 34 transmits the prompts 37 to the telephony interface 32 and the grammar references 38 to the speech server 33. The prompts 37 can include call information in the form of a file or script. The file can include text, sound, or image information. When the prompts 37 include speech, the speech is automatically played back to the caller via the telephony interface 32, but when the prompt includes text, the text must first be converted into speech prior to playback to the caller. Other types of prompts are possible.

The caller can provide audio responses 39, including speech utterances, which are sent to the speech server 33 via the message server 34. Using the grammar references, the speech server performs distributed speech recognition on the audio responses 39, which is further discussed below with reference to FIGS. 4-9. Distributed speech recognition results 40 can be sent to the agent console 35 or transmitted to the script engine 31 for further processing.

If the distributed speech recognition results 40 are sent to the agent console 35, the results 40 are displayed for review by an agent. The agent can modify the distributed speech recognition results 40 or select a further prompt 37, including a file or script for playback to the caller in response to the audio data 39. The further prompt 37 can be selected based on the results of the speech recognition. When further communication with the caller is necessary, the process of collecting and processing the audio responses 39 can be repeated.

In one embodiment, the message server can assign a confidence level to the distributed speech recognition results 40, which provides an indication of accuracy. If the confidence level is below a predetermined threshold, a placeholder can be assigned to the results 40, prior to sending the results to the agent console 35 or script engine 31. The placeholder provides notification that further results 40 are being generated. The script engine can automatically query the message server 34 for the further results 40. The agent can also query the message server 34 for the further results 40, as well as modify the further results 40.

Figure 4:
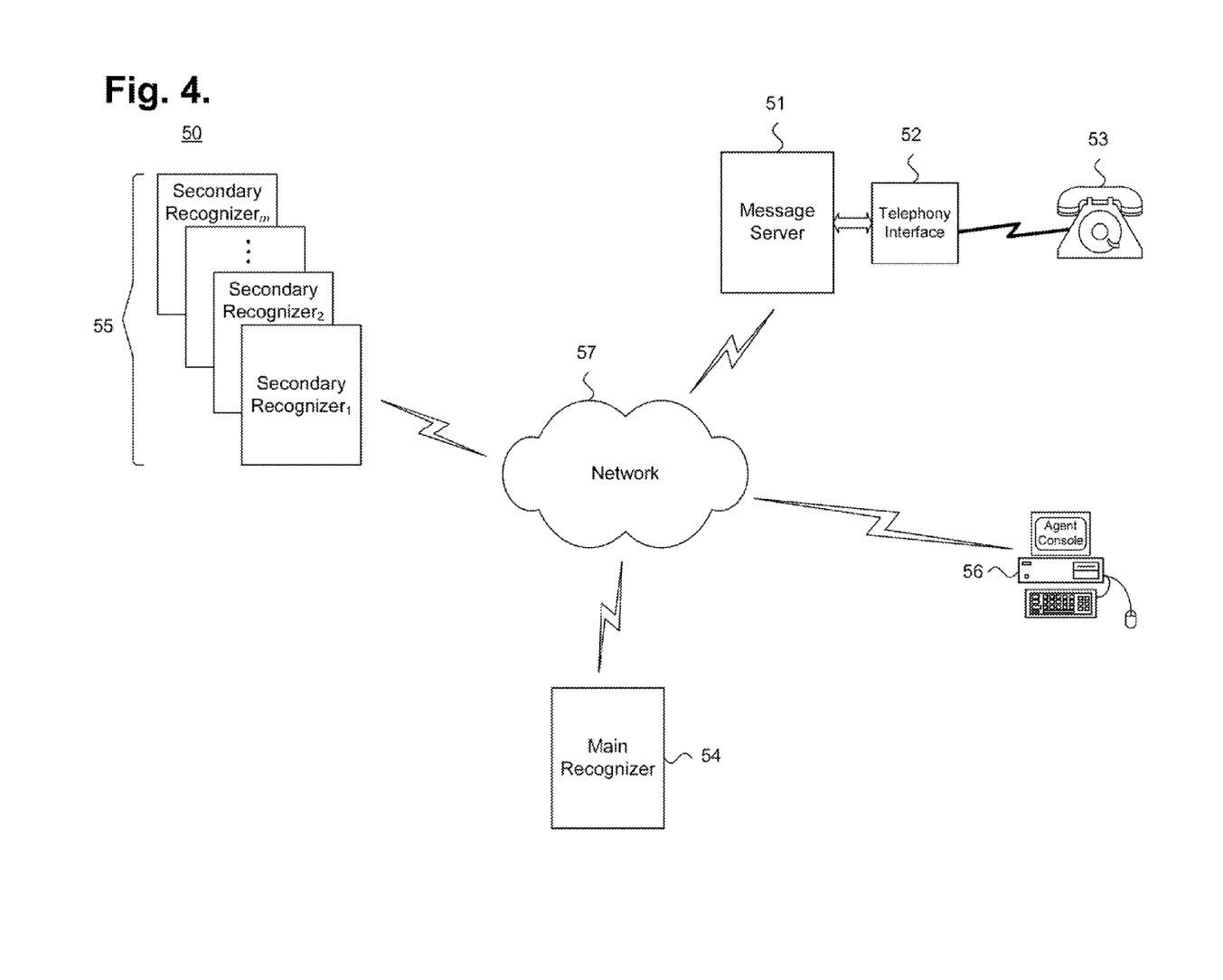
FIG. 4 is a block diagram showing a system for performing distributed speech recognition, in accordance with one embodiment.

To reduce caller hold time during speech recognition processing, the speech server can include multiple tiers of hierarchically-organized recognizers to conduct distributed speech recognition. FIG. 4 is a block diagram showing a system for performing distributed speech recognition 50, in accordance with one embodiment. Customer calls are received through a telephony interface 52, which is operatively coupled to a message server 51 to provide access to a telephone voice and data network 53. In one embodiment, the telephony interface connects to the telephone network 53 over a T-1 carrier line, which can provide up to 24 individual channels of voice or data traffic provided at 64 kilobits (Kbits) per second. Other types of telephone network connections are possible.

The system 50 is architected into two or more tiers of speech recognizers. In one embodiment, a main recognizer 54 and one or more secondary recognizers 55 are organized into two tiers. The main recognizer 54 and secondary recognizers 55 are interconnected to the message server 51 over a network infrastructure 57, such as the Internet or a non-public enterprise data network. An agent console 56 is further connected to the message server 51 over the network structure 57. The network infrastructure 57 can be either wired or wireless and, in one embodiment, is implemented based on the Transmission Control Protocol/Internet Protocol (TCP/IP) network communications specification, although other types or combinations of networking implementations are possible. Similarly, other network topologies and arrangements are possible.

The main recognizer 54 interfaces directly to the message server 51 and to each of the secondary recognizers 55 as a top-level or root tier of a speech recognition hierarchy. Each of the secondary recognizers 55 are interfaced directly to the main recognizer 54 as a second level or tier of the speech recognition hierarchy. Further levels or tiers of tertiary recognizers, quaternary recognizers, and so forth, are possible.

The message server 51 sends streamed audio data for each call to the main recognizer 54 and secondary recognizers 55, which then perform distributed speech recognition, as further described below with reference to FIGS. 6 and 7. Briefly, the message server 51 assigns grammar generation and speech recognition to the main recognizer 54 and delegates secondary speech recognition to the secondary recognizers 55, which each reference non-overlapping sections of a main grammar. In a further embodiment, each secondary recognizer 55 could be assigned independent grammars, such as language-specific grammars. Secondary speech recognition search results identified by the secondary recognizers 55 are used by the main recognizer 54 to generate a new grammar, from which a final set of speech recognition search results are identified and sent to the message server 51.

Operationally, upon startup, the telephony gateway 52 opens a T-1 carrier device channel for each available T-1 time slot. The telephony gateway 52 initiates a new connection to the message server 51, one connection per T-1 device channel, and the message server 51, in turn, initiates a corresponding new connection to the main recognizer 54. Finally, for each open T-1 device channel, the main recognizer 54 initiates a new connection to each of the secondary recognizers 55. The number of secondary recognizers 55 is independent from the number T-1 device channels.

The separate telephony gateway-to-message server, message server-to-main recognizer, and main recognizer-to-secondary recognizer connections form one concurrent session apiece. When a customer call is answered or connected, the telephony gateway 52 sends a call message to the message server 51. The message server 51 then sends a new call message to the main recognizer 54, which starts a new speech recognition session. The main recognizer 54 sends a new call message to each of the secondary recognizers 55, which also start new speech recognition sessions. Thus, given n secondary recognizers 55, n+1 concurrent speech recognition sessions are used for each call.

Each component, including the message server 51, main recognizer 54, and secondary recognizers 55, is implemented as a computer program, procedure or module written as source code in a conventional programming language, such as the C++ programming language, and presented for execution by a computer system as object or byte code. Alternatively, the components could be directly implemented in hardware, either as integrated circuitry or burned into read-only memory components. The various implementations of the source code and object and byte codes can be held on a computer-readable storage medium or embodied on a transmission medium in a carrier wave. The system 50 operates in accordance with a sequence of process steps, as further described below with reference to FIGS. 6 and 7.

Grammar and Search Result Distribution

Figure 5:
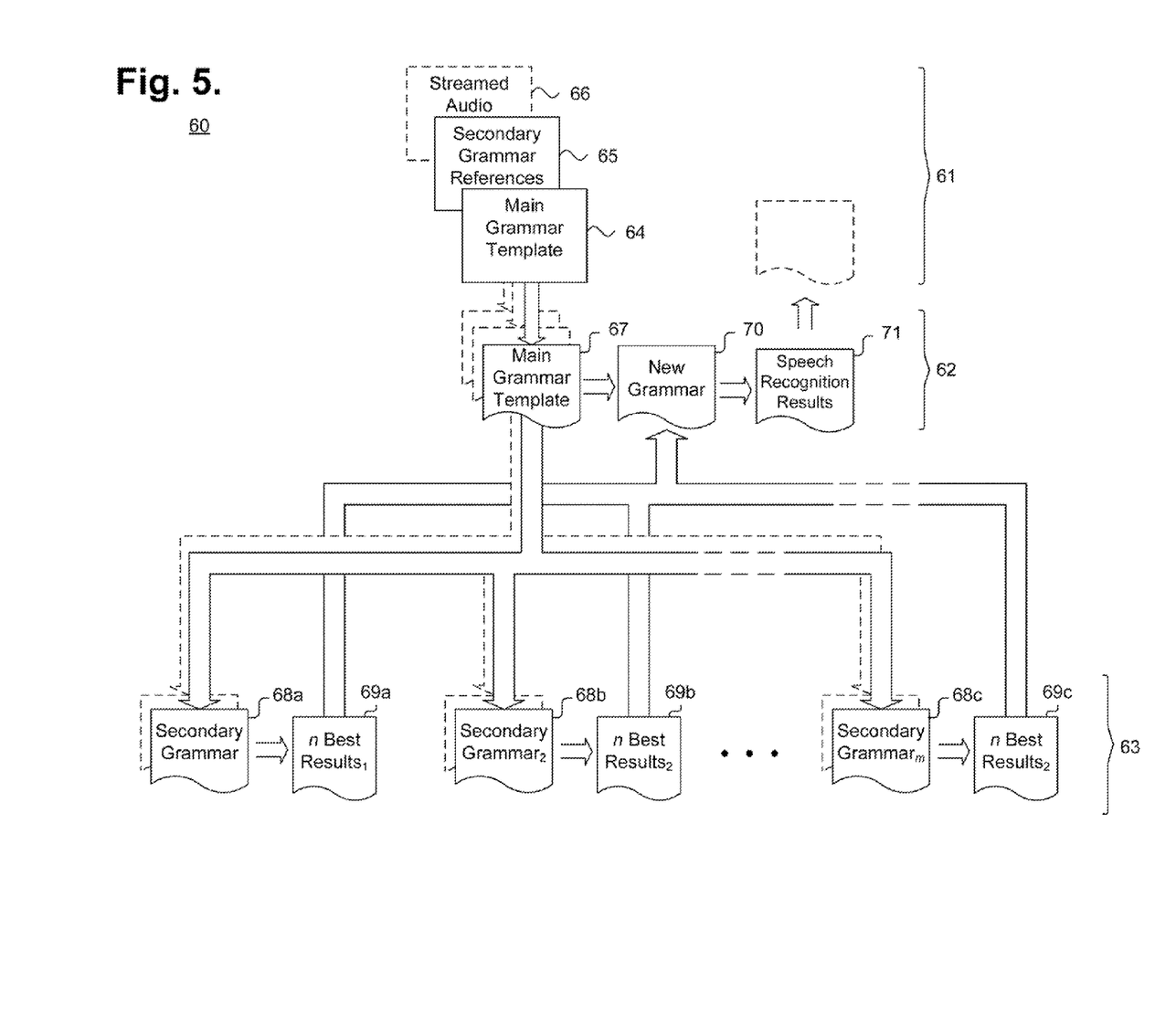
FIG. 5 is a data flow diagram showing grammar and search result distribution in the system of FIG. 4.

Speech recognition is performed through message exchange and streamed audio data communicated via the network infrastructure 57. FIG. 5 is a data flow diagram showing grammar and search result distribution 60 in the system 50 of FIG. 4. Speech recognition tasks and search results are communicated as messages between a message server level 61, main recognizer level 62, and secondary recognizer level 63.

For each speech utterance, the message server 51 sends a main grammar template 64 and a set of secondary grammar references 65 to the main recognizer 54. The main recognizer 54 stores the main grammar template 67, which specifies the structure for a new grammar 70 that will eventually be generated based on secondary search results provided by the secondary recognizers 55. The main recognizer 54 forwards the secondary grammar references 65 to each of the secondary recognizers 55, which use their respective secondary grammar reference 65 to identify a secondary grammar 68a-c for use in secondary speech recognition. In one embodiment, each secondary grammar 68a-c is a non-overlapping section of a main grammar, and the message server 51 assigns each section to the secondary recognizers 55 to balance work load and minimize grammar search latency times.

Speech recognition is performed on streamed audio data 66, which is received from the telephony interface 52 by way of the message server 51. The streamed audio data 66 is forwarded to and stored by the main recognizer 54 and by each of the secondary recognizers 55. The secondary recognizers 55 each perform speech recognition on the streamed audio data 66 against their respective secondary grammars 68a-c to generate a set of raw secondary search results. Each secondary speech recognizer 55 then applies a form of the n-best algorithm by selecting the n most likely search results from each set of raw secondary search results, which are then sent to the main recognizer 54 as secondary search results 69a-c. The main recognizer 54 uses the secondary search results 69a-c to form the new grammar 70. Other forms of applicative search result selection algorithms are possible. Speech recognition can be performed by each secondary recognizer 55 using a speech recognition engine, such as the OpenSpeech Recognizer speech engine, licensed by Nuance Communications, Inc., Burlington, Mass. Other speech recognition engines and approaches are possible.

The main recognizer 54 constructs a new grammar 70 based on the stored main grammar template 67 using the secondary search results 69a-c as a new "vocabulary." As the secondary search results 69a-c generated by each secondary recognizer 55 differ based on the non-overlapping secondary grammars 68a-c used, the main grammar 54 compensates for probabilistic ties or close search results by using the secondary search results 69a-c, which each include the n most likely secondary search results identified by each secondary recognizer 55, to form the new grammar 70. The main recognizer 54 then performs speech recognition on the stored streamed audio data 66 against the new grammar 70 to generate a set of speech recognition results 71, which are sent to the message server 51. Speech recognition can be performed by the main recognizer 54 using a speech recognition engine, such as the OpenSpeech Recognizer speech engine, described above. Other speech recognition engines and approaches are possible.

Method for Performing Distributed Speech Recognition

Control over distributed speech recognition is mainly provided through the message server 51, which sends the main grammar template 64 and secondary grammar references 65 to initiate speech recognition for each speech utterance. The main recognizer 54 and secondary recognizers 55 then operate in concert to perform the distributed speech recognition. FIGS. 6 and 7 are flow diagrams respectively showing a method for performing distributed speech recognition using a main recognizer 54 and a secondary recognizer 55, in accordance with one embodiment.

Figure 6:
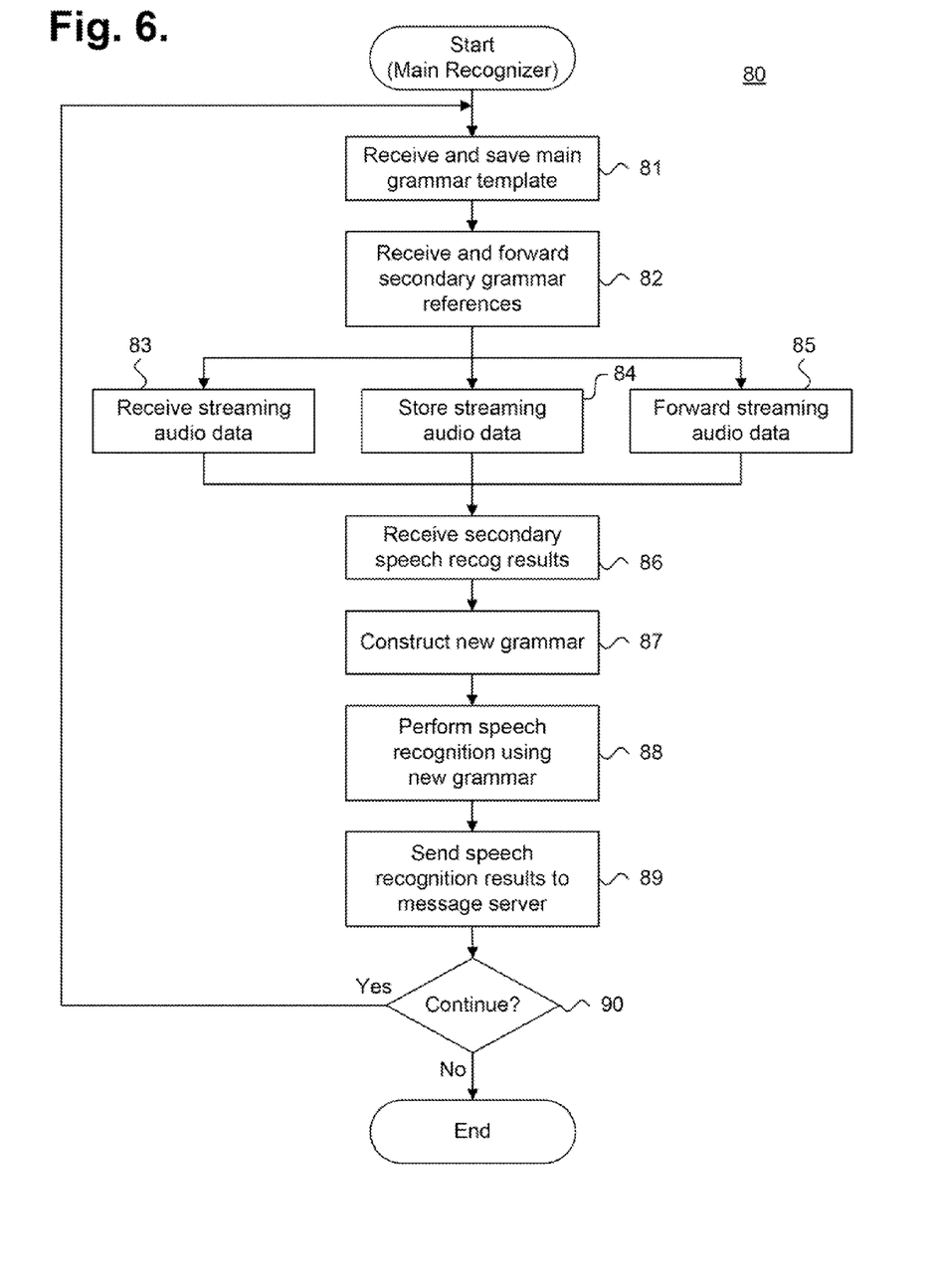
FIG. 6 is a flow diagram showing a method for performing distributed speech recognition using a main recognizer, in accordance with one embodiment.

FIG. 6 is a flow diagram showing a method 80 for performing distributed speech recognition using a main recognizer. The main recognizer 54 initiates a new main speech recognition session upon receiving and saving a main grammar template 67 from the message server 51 for each speech utterance (block 81). The main recognizer 54 also receives secondary grammar references 65 from the message server 51, which are forwarded to each of the secondary recognizers 55 (block 82). To avoid incurring latency delays, the main recognizer 54 simultaneously receives streamed audio data 66 from the message server 51 (block 83), while also respectively storing and forwarding the streamed audio data 66 to the secondary recognizers 55 (blocks 84 and 85). Following secondary speech recognition, the main recognizer 54 receives secondary search results 69a-c from each of the secondary recognizers 55 (block 86), from which the main recognizer 54 constructs a new grammar 70 based on the stored main grammar template 67 (block 87). The main recognizer 54 then performs speech recognition on the stored streamed audio data 66 against the new grammar 70 (block 88) and sends the resulting set of speech recognition results 71 to the message server 51 (block 89). Main speech recognition continues until the message server 51 closes the call session (block 90).

Figure 7:
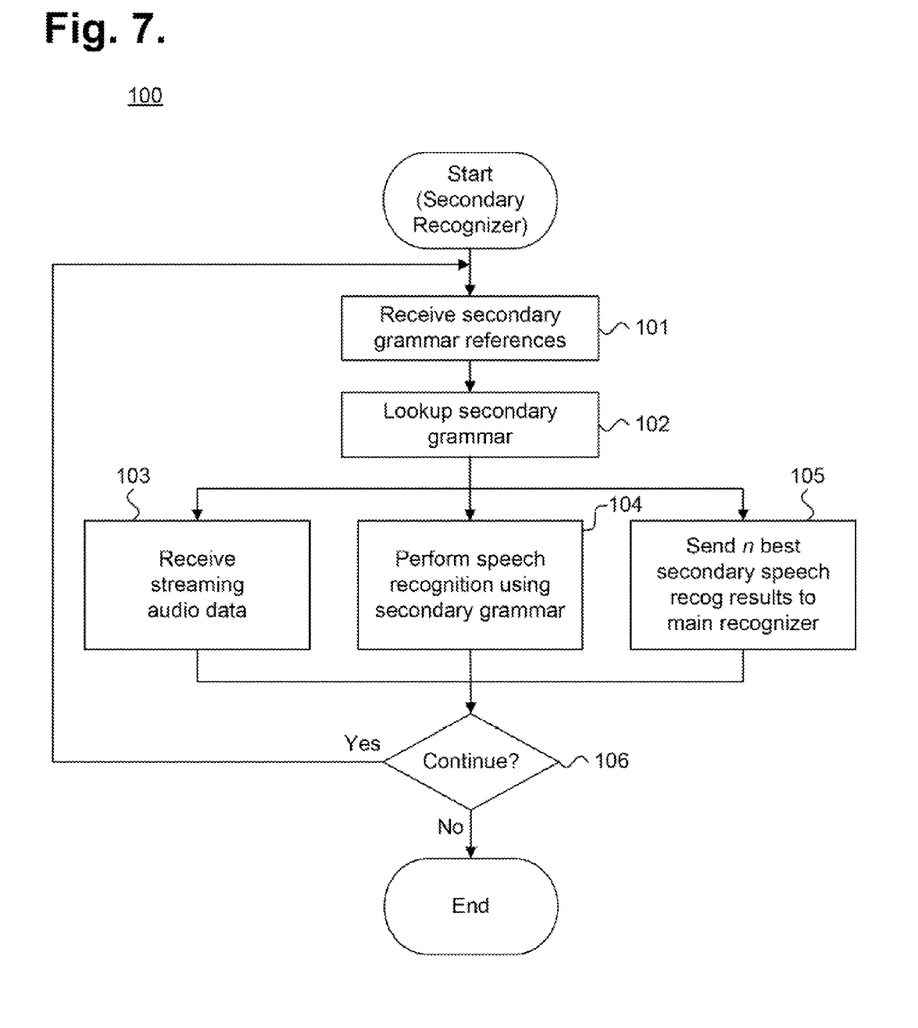
FIG. 7 is a flow diagram showing a method for performing distributed speech recognition using a secondary recognizer, in accordance with one embodiment.

FIG. 7 is a flow diagram showing a method 100 for performing distributed speech recognition using a secondary recognizer, in accordance with one embodiment. Each secondary recognizer 55 initiates a new secondary speech recognition session upon receiving the secondary grammar references 65 from the message server 51 by way of the main recognizer 54 (block 101). The secondary recognizer 55 looks up the appropriate non-overlapping secondary grammar 68a-c using the secondary grammar reference 65 assigned by the message server 51 (block 102). In one embodiment, each secondary grammar 68a-c is a non-overlapping section of a main grammar. To avoid incurring latency delays, each secondary recognizer 55 simultaneously receives the streamed audio data 66 (block 103), while performing speech recognition on the streamed audio data against their respective secondary grammar 68a-c and sending the n best secondary search results 69a-c to the main recognizer 54 (blocks 104 and 105). Secondary speech recognition continues until the message server 51 closes the call session (block 106).

In a further embodiment, additional levels or tiers of tertiary recognizers, quaternary recognizers, and so forth, can be implemented by expanding on the operations performed by the main recognizer 54 and secondary recognizers 55. For example, secondary grammar templates can be sent to the secondary recognizers 55 instead of secondary grammar references, and tertiary grammar references can be sent to tertiary recognizers, which perform tertiary speech recognition and send tertiary search results to the secondary recognizers 55. The secondary recognizers 55 would then construct new secondary grammars using the tertiary search results based on the secondary grammar templates, against which speech recognition would be performed. Other arrangements and assignments of new grammars and non-overlapping grammars are possible.

Main and Secondary Recognizers

Figure 8:
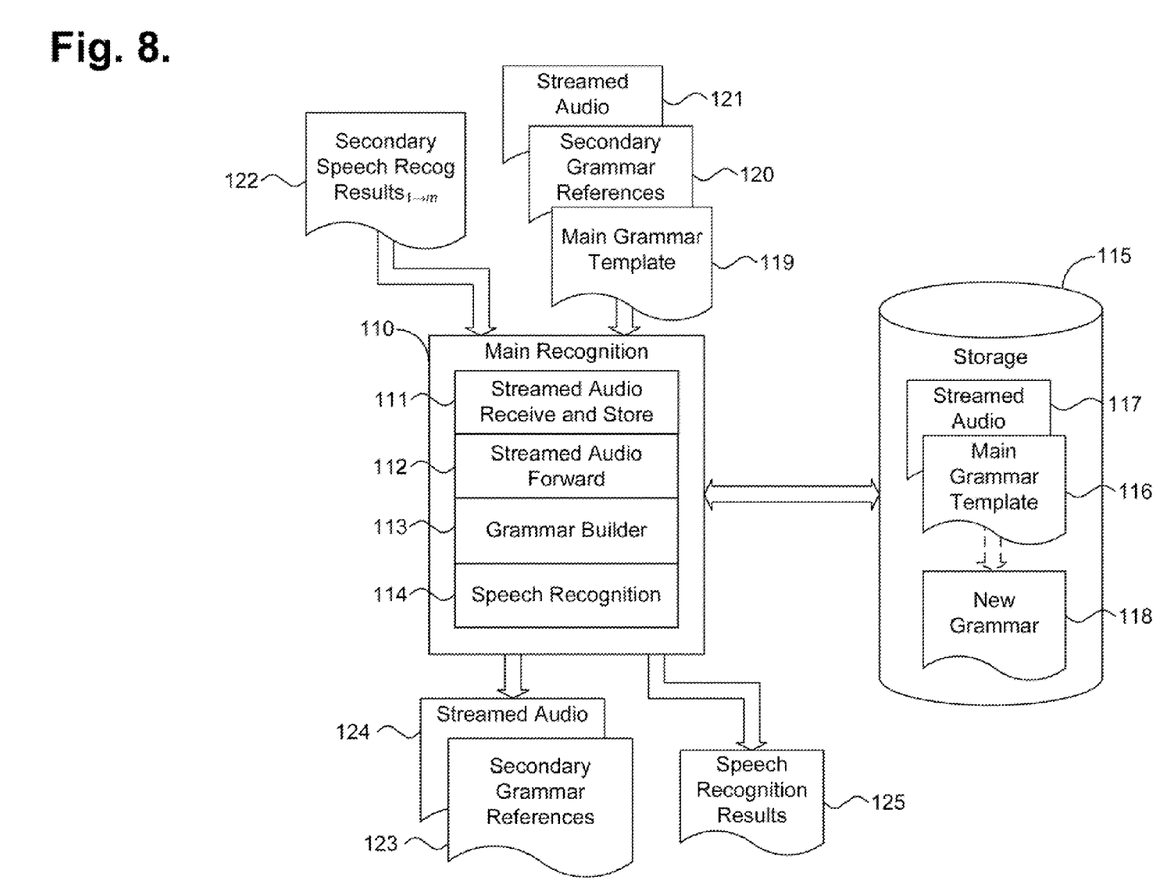
FIG. 8 is a functional block diagram showing a main recognizer for use in the system of FIG. 4.
Figure 9:
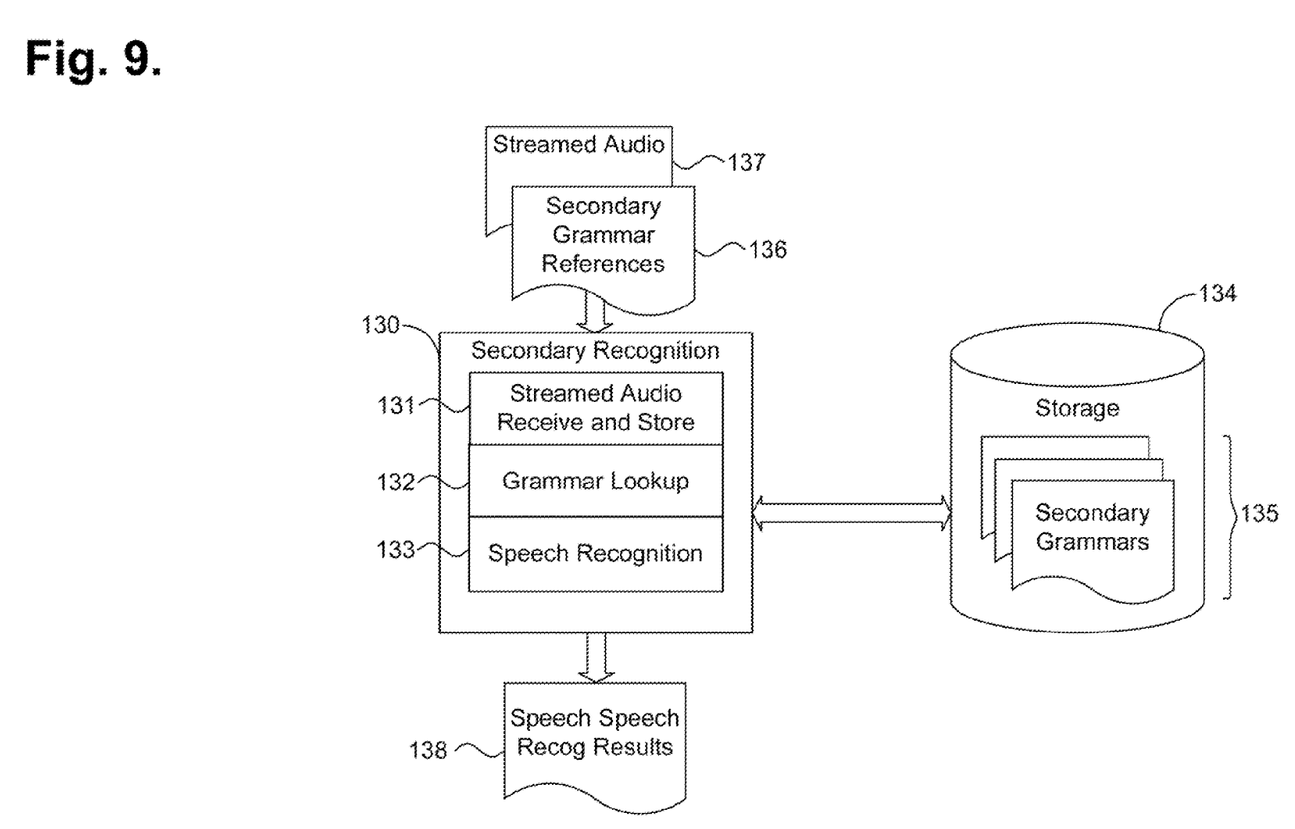
FIG. 9 is a functional block diagram showing a secondary recognizer for use in the system of FIG. 4.

In one embodiment, the message server 51, main recognizer 54, and each of the secondary recognizers 55 are implemented on separate computing platforms to minimize competition for resources, such as memory access, hard disk data retrieval and communications, between the recognizers, which may lead to latency delays. FIGS. 8 and 9 are functional block diagrams respectively showing a main recognizer 110 and a secondary recognizer 130 for use in the system of FIG. 4. In a further embodiment, the foregoing components can be combined on the same physical computing platform, but defined functionally as separate components, or can be provided in various arrangements of distributed processing system organizations.

Referring to FIG. 8, the main recognizer 110 includes a storage device 115 and modules for streamed audio data receipt and storage 111, streamed audio data forwarding 112, grammar building 113, and speech recognition 114. The module for streamed audio data receipt and storage 115 receives streamed audio data 121 from the message server 51, which is simultaneously stored as streamed audio data 117 in the storage device 115. The module for streamed audio data forwarding 112 also simultaneously sends the streamed audio data 124 to each of the secondary recognizers 55. The grammar builder 113 receives the main grammar template 119 and secondary grammar references 120 from the message server 51 and stores the main grammar template 116 in the storage device 115. A grammar builder 113 forwards the secondary grammar references 123 to the secondary recognizers 55 and builds a new grammar 118 based on the main grammar template 116 using secondary speech recognition results 122 received from the secondary recognizers 55. Finally, the speech recognizer 114 performs speech recognition on the stored streamed audio data 117 against the new grammar 118 to generate a set of speech recognition results 125, which are sent to the message server 51. Other main recognizer components and functionality are possible.

Referring next to FIG. 9, each secondary recognizer 130 includes a storage device 134 and modules for streamed data audio receipt 131, grammar lookup 132, and speech recognition 133. The module for streamed audio data receipt 131 receives streamed audio data 137 from the message server 51 by way of the main recognizer 54. The module for grammar lookup 132 looks up the secondary grammar 135 that was assigned by the message server 51 using the secondary grammar reference 136. The secondary grammar 135 is stored in the storage device 134. The speech recognizer 133 performs speech recognition on the streamed audio data 137 against the secondary grammar 135 to generate secondary speech recognition results 138, which are sent to the main recognizer 54 to the use in building a new grammar. Other secondary recognizer components and functionality are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for distributed speech recognition, comprising:
   audio data from a caller participating in a call with an agent; and
   a processor to execute the following:
      secondary recognizers, each secondary recognizer to receive the audio data and a reference that identifies a secondary grammar, wherein each secondary grammar is a non-overlapping section of a main grammar template, to perform speech recognition comprising identifying speech recognition results by applying the secondary grammar to the audio data and by selecting an n number of most likely speech recognition results; and
      a main recognizer to receive the main grammar template and the audio data, to construct a new grammar using the speech recognition results from each of the secondary recognizers as a new vocabulary based on the main grammar template, and to identify further speech recognition results by applying the new grammar to the audio data.

2. A system according to claim 1, further comprising:
   a display to display the further speech recognition results to the agent.

3. A system according to claim 1, further comprising:
   a response to the audio data based on the further speech recognition results.

4. A system according to claim 1, further comprising:
   a prompt selected by the agent in response to the audio data from the caller, wherein the prompt comprises one of a file and a script.

5. A system according to claim 1, further comprising:
   a confidence level assigned to at least one of the further speech recognition results;
   a predetermined threshold applied to the confidence levels; and
   a placeholder assigned to the speech recognition results with confidence levels below the threshold, wherein the placeholder provides notification that further results are being generated.

6. A system according to claim 5, wherein the further results are queried by at least one of the agent and automatically.

7. A system according to claim 1, further comprising:
   further grammar recognizers, each grammar recognizer to receive further grammar references from one of the secondary recognizers, to perform speech recognition on each of the further grammar references, and to identify a further n number of most likely speech recognition results; and
   the secondary recognizers, each secondary recognizer to receive a secondary grammar template and to construct a new secondary grammar using the further n number of most likely speech recognition results from the associated further grammar recognizers, based on the secondary grammar templates.

8. A system according to claim 7, wherein the new secondary grammar is used to perform speech recognition.

9. A system according to claim 1, wherein each of the secondary recognizers is directly interfaced to the main recognizer as a second level of recognition hierarchy.

10. A system according to claim 1, wherein the main recognizer and each of the secondary recognizers simultaneously receive the audio data.

11. A method for distributed speech recognition, comprising:
   obtaining audio data from a caller participating in a call with an agent;
   receiving on a main recognizer, a main grammar template and the audio data;
   receiving on each of a plurality of secondary recognizers, the audio data and a reference that identifies a secondary grammar, wherein each secondary grammar is a non-overlapping section of the main grammar template;
   performing speech recognition on each of the secondary recognizers, comprising:
      identifying speech recognition results by applying the secondary grammar to the audio data; and
      selecting an n number of most likely speech recognition results;
   constructing by the main recognizer, a new grammar using the speech recognition results from each of the secondary recognizers as a new vocabulary based on the main grammar template; and
   identifying further speech recognition results by applying the new grammar to the audio data.

12. A method according to claim 11, further comprising:
   displaying the further speech recognition results to the agent.

13. A method according to claim 11, further comprising:
   generating a response to the audio data based on the further speech recognition results.

14. A method according to claim 11, further comprising:
playing a prompt selected by the agent in response to the audio data from the caller, wherein the prompt comprises one of a file and a script.

15. A method according to claim 11, further comprising:
assigning a confidence level to at least one of the further speech recognition results;
applying a predetermined threshold to the confidence levels; and
assigning a placeholder to the speech recognition results with confidence levels below the threshold, wherein the placeholder provides notification that further results are being generated.

16. A method according to claim 15, wherein the further results are queried by at least one of the agent and automatically.

17. A method according to claim 11, further comprising:
receiving on one or more of the secondary recognizers, a secondary grammar template;
receiving on each of a plurality of further grammar recognizers, further grammar references to further grammars, wherein each further grammar is a non-overlapping section of the secondary grammar template received on the secondary recognizer;
performing speech recognition on each of the further grammars and identifying a further n number of most likely speech recognition results; and
constructing on the secondary recognizer, a new secondary grammar using the further speech recognition results based on the secondary grammar templates.

18. A method according to claim 17, further comprising:
performing speech recognition using the new secondary grammar.

19. A method according to claim 11, wherein each of the secondary recognizers is directly interfaced to the main recognizer as a second level of recognition hierarchy.

20. A method according to claim 11, wherein the main recognizer and each of the secondary recognizers simultaneously receive the audio data.

* * * * *